United States Patent [19]

Dangel

[11] Patent Number: 4,520,690

[45] Date of Patent: Jun. 4, 1985

[54] INTER-AXLE DIFFERENTIAL TRANSFER BOX UNIT FOR A FOUR-WHEEL DRIVE VEHICLE

[76] Inventor: Henry Dangel, 7 Rue du Sillon, 68100 Mulhouse, France

[21] Appl. No.: 495,393

[22] Filed: May 11, 1983

[30] Foreign Application Priority Data

May 14, 1982 [FR] France .................. 82 08440

[51] Int. Cl.³ .................. F16H 37/08; F16H 37/06
[52] U.S. Cl. .................. 74/695; 74/705; 180/249
[58] Field of Search .......... 74/665 GB, 665 T, 705, 74/695; 180/248, 249, 250

[56] References Cited

U.S. PATENT DOCUMENTS

| | | | |
|---|---|---|---|
| 1,682,386 | 8/1928 | Lewis | 74/710.5 |
| 3,400,777 | 9/1968 | Hill | 180/249 |
| 3,492,890 | 2/1970 | Hill et al. | 180/249 X |
| 4,428,452 | 1/1984 | Muraoka et al. | 180/249 |
| 4,431,079 | 2/1984 | Suzuki | 74/695 X |
| 4,441,575 | 4/1984 | Suzuki | 180/248 |

FOREIGN PATENT DOCUMENTS

| | | | |
|---|---|---|---|
| 0043806 | 1/1982 | European Pat. Off. | 180/249 |
| 578098 | 9/1924 | France . | |
| 2358288 | 2/1978 | France . | |
| 113653 | 2/1918 | United Kingdom . | |

*Primary Examiner*—Dirk Wright
*Attorney, Agent, or Firm*—Wenderoth, Lind & Ponack

[57] ABSTRACT

The transmission device comprises at least two differentials the first of which has two output semi-shafts each of which drives a driving wheel of a first axle of the vehicle. The transmission device includes a second differential interposed between the first differential 1 and one of the wheels of the vehicle, the input element 17 of the second differential 12 being driven by the corresponding output semi-shaft 11 of the first differential 1 and its output elements 21, 23, 24 driving, on one hand, said one of the wheels and, on the other hand, a transmission shaft 32 which is connected to a second axle of the vehicle. The first differential is of the epicyclic gear train type which divides the driving torque applied to its input element in an unequal manner between its output elements.

10 Claims, 3 Drawing Figures

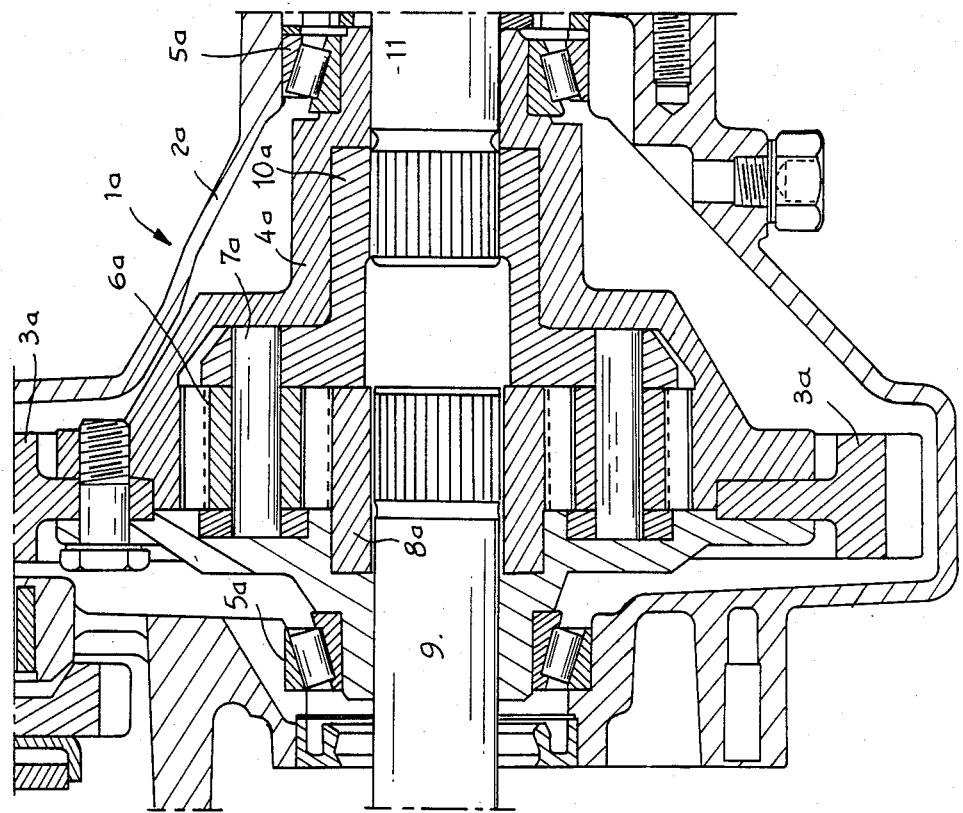

INTER-AXLE DIFFERENTIAL TRANSFER BOX UNIT FOR A FOUR-WHEEL DRIVE VEHICLE

DESCRIPTION

The present invention relates to an inter-axle differential transfer box unit for a four-wheel drive vehicle.

The advantages resulting from a four-wheel drive transmission for cross-country vehicles, and even road vehicles, in respect of the increased propelling effect they produce in the driving of the vehicles under poor road adherence conditions are well known. Indeed, the transmission of a given torque simultaneously to the four wheels of a vehicle halves the effort on the wheel rim relative to a conventional transmission having two driving wheels.

While the four-wheel drive transmission is therefore essential for cross-country vehicles, it is also of very great interest for road vehicles owing to the stability of the trajectory of the vehicle and the adherence of the wheels to the road that it ensures on slippery roads.

The four wheels must then be permanently driving wheels and this requires the use of an inter-axle differential in the transfer box.

Many types of cross-country vehicles having four driving wheels are already known and the arrangement of a transfer box with an inter-axle differential is conventional and various configurations thereof have been employed, in particular in motor vehicles having a longitudinal engine.

As the design, research and the development of a specific vehicle involves considerable expense, it has appeared desirable to provide an inter-axle differential and transfer box unit which may be adapted to mass-produced conventional vehicles. Such an arrangement has already been used in vehicles having a longitudinal engine, but at the cost of increased overall size.

As concerns series-produced vehicles having a transverse engine and a front-wheel drive, the construction of such an adaptable unit which is simple, effective and compact encounters many technical difficulties.

An object of the invention is to solve these difficulties and to provide a transmission device for a vehicle having four driving wheels which is adaptable just as well to a mass-produced vehicle having a front, rear, transverse or longitudinal engine.

The invention therefore provides a transmission device for a vehicle having four driving wheels comprising at least two differentials, of which a first differential comprises two output semi-shafts each driving a driving wheel of a first axle, wherein there is provided a second differential interposed between said first differential and one of said wheels, the input element of said second differential being driven by the corresponding semi-shaft of the first differential and its output elements driving, on one hand, said wheel and, on the other hand, a transmission shaft connected to a second axle.

According to a preferred embodiment of the invention, said first differential is of the epicyclic train type whose features are so chosen that the driving torque applied to its ring gear is divided unequally between the semi-shaft driving said wheel and the semi-shaft driving the second differential.

Advantageously, the driving torque is divided in a proportion of $\frac{1}{3}$ for the semi-shaft driving said wheel and $\frac{2}{3}$ for the semi-shaft driving the second differential.

According to another feature of the invention, the housing of said second differential is connected to the housing of the first differential and locking means are provided between the body of the first differential and said output element driven by the second differential.

Further features and advantages of the invention will be apparent from the ensuing description with reference to the accompanying drawing which is given solely by way of example and in which:

FIG. 3 is a partial sectional view of the first differential in a modification of the transmission device according to the invention.

The invention will be described hereinafter in its application to a front-wheel drive vehicle having a transverse engine.

Figure 1:
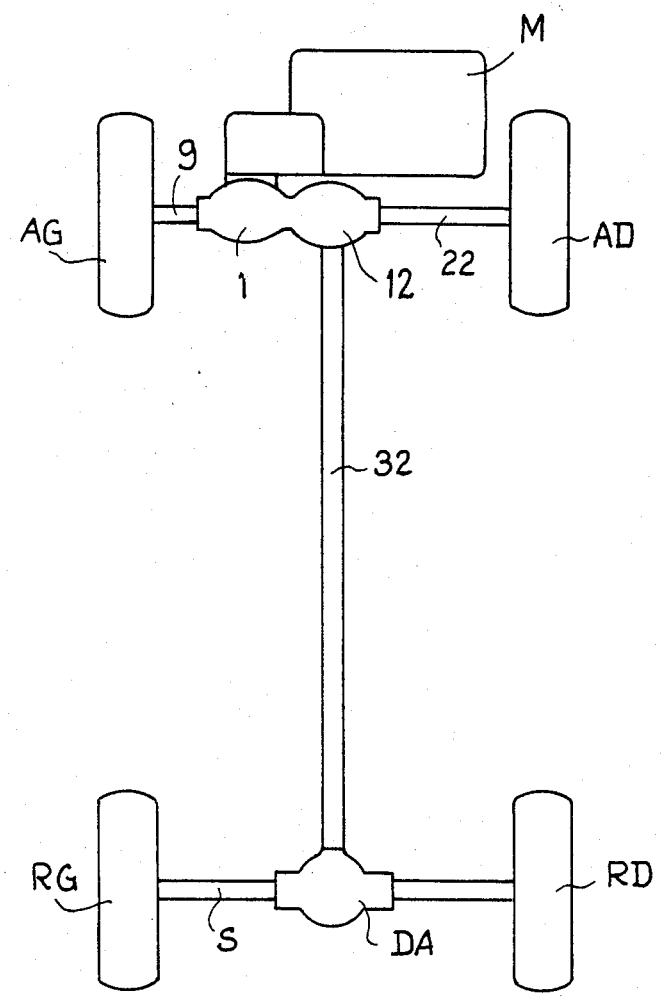
FIG. 1 is a diagrammatic view of a transmission device according to the invention applied to a vehicle having four driving wheels and a transverse front engine.

With reference to the drawings, FIG. 1 shows diagrammatically a transmission device according to the invention in its application to a vehicle having a front engine M driving two front left and right driving wheels AG, AD respectively, through a differential 1 and two semi-shafts 9, 22. The vehicle also has a rear axle S carrying two left and right wheels RG and RD respectively.

According to the invention, the rear wheels RG and RD are driven by a transmission device which comprises a second differential 12 which is driven by one of the output elements of the differential 1, this second differential being interposed between the first differential and one of the front driving wheels, for example AD, and its output elements driving a transmission shaft 32 and a rear differential DA in the known manner.

Figure 2:
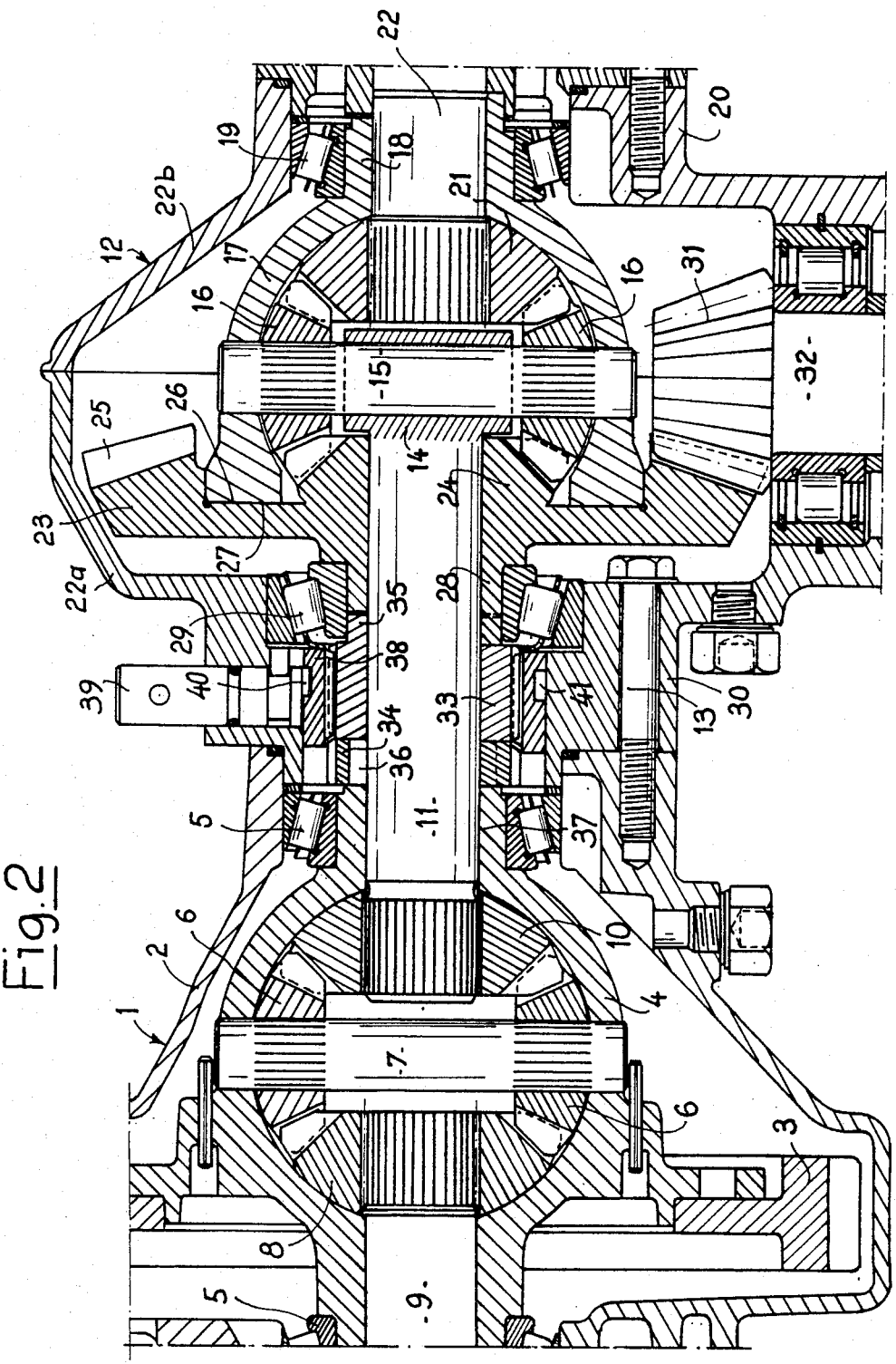
FIG. 2 is a top plan and sectional view of one embodiment of the inter-axle differential transfer box unit diagrammatically represented in FIG. 1.

With reference to FIG. 2, a first differential of a motor vehicle having four driving wheels, generally designated by the reference numeral 1, comprises in the known manner a housing 2 enclosing a ring gear 3 driven by the output element of the gear box of the vehicle (not shown), this ring gear being connected to a case or body 4 which is rotatively mounted in the housing 2 by means of rolling bearings 5 and drives planet gears 6 mounted on a shaft 7 and meshed with sun gears of which one, 8, is rigid with a semi-shaft 9, for example of the left front wheel, whereas the other, 10, is rigid with a semi-shaft 11 which carries on the original vehicle, at the opposite end thereof, the right front wheel of the vehicle which is located at a greater distance from the differential than the left front wheel.

According to the invention, the transmission device comprises a second differential generally designated by the reference numeral 12 and interposed between the first differential 1 and the front right wheel of the vehicle.

In the illustrated embodiment, the housing of the differential 12 is formed by two semi-shells 22a, 22b, the semi-shell 22a being fixed to the right open end of the housing 2 of the differential 1, for example by bolts 13, the two semi-shells being assembled by known means (not shown).

The differential 12 comprises a driving element constituted by the output semi-shaft 11 of the first differential whose end remote from the differential 1 has been modified, for example as shown at 14, so as to receive and drive in rotation a perpendicular shaft 15 which carries planet gears 16 and whose end portions are mounted in a case or body 17 having a bell shape and whose narrow portion or hub 18 is mounted by means of a rolling bearing 19 in the right end portion 20 of the semi-shell 22b.

The planet gears 16 are meshed, on one hand, with a sun gear 21 coupled to an output semi-shaft 22 which is rotatively mounted in the hub 18 of the body 17 and at the outer end of which is mounted the front right wheel of the vehicle, and, on the other hand, with an output element 23 formed by a circular plate having two concentric sets of teeth 24, 25, the central set of teeth 24 constituting the second sun gear of the differential 12 and the outer set of teeth 25 constituting a ring gear.

The teeth 24, 25 define therebetween an annular planar surface 26 against which bears a circular end surface 27 of the body 17. The hub 28 of the element 23 is rotatively mounted around the semi-shaft 11 by means of a rolling bearing 29 in the end portion 30 of the semi-shell 22a.

The teeth 25 forming the ring gear are meshed with a gear pinion 31 rigid with a transmission shaft 32 which transmits the torque to the differential driving the rear wheels of the vehicle (not shown).

It will be understood that the semi-shaft 22 of the front right wheel is driven in rotation in the same direction as the semi-shaft 9 of the differential 1 and the semi-shaft 11, the output element 23 driven by the planet gears 16 transmitting the motion to the gear pinion 31 and to the transmission shaft 32. In this way, there is obtained a constant drive of the four wheels of the vehicle by means of a transmission device disposed at the same level as the original differential of the vehicle, ie its mounting on the vehicle does not result in a decrease in the ground clearance.

However, it should be mentioned that in the transmission device described hereinbefore, the driving torque applied to the ring gear 3 of the first differential 1 is unequally divided between the two front wheels, the left front wheel receiving 50% of this torque while the remaining 50% are divided into one half for the front right wheel and one half for the output element 23 of the second differential 12.

In order to overcome this drawback, according to a modification shown in FIG. 3, the first differential is advantageously of the epicyclic train type whose features are so chosen that the driving torque applied to its input element is unequally divided between its output elements.

This differential having an epicyclic gear train, generally designated by the reference numeral 1a, is conventional and therefore will only be described briefly.

In the known manner, it comprises a housing 2a, an input element formed by a ring gear 3a rigid with a housing 4a which has internal teeth meshed with planet gears 6a rotatively mounted on shafts 7a of a planet gear carrier 10a which is coupled by means of splines with the right semi-shaft 11.

The planet gears 6a are also meshed with external teeth of a sun gear 8a formed by a sleeve surrounding the end portion of the semi-shaft 9 to which it is coupled by means of splines.

The housing 4a is rotatively mounted in rolling bearings 5a and enclosed in a shell 2a.

The features of this differential are so chosen that the driving torque applied to the ring gear 3a is divided in the proportion of ⅓ for the front left semi-shaft 9 and ⅔ for the semi-shaft 11 driving the second differential 12 whose output torque is also divided between the front right semi-shaft 22 and the output element 23 in the proportion of ⅓ for each thereof.

There is thus provided a compact unit which may be adapted to a series production vehicle without essential modifications of the latter.

The unit according to the invention further comprises a locking device which is of utility in the case of slip, this device being provided between the body 4 of the first differential and the output element 23 rigid with the sun gear 24 of the second differential 12.

This device comprises a first sleeve 33 rotatively mounted on the semi-shaft 11 and having splines on its outer peripheral surface, and a second sleeve 34 also mounted to be rotatable about the semi-shaft 11 and also having in its outer peripheral surface splines corresponding to the splines of the sleeve 33.

The contacting surfaces of the sleeves 33, 34 are smooth and their opposite end surfaces include dog clutches 35, 36 engaged with corresponding dog clutches formed in the hub 28 of the output element 23 on one hand, and in the hub 37 of the body 4 of the differential 1 on the other hand.

A third sleeve 38 surrounds the sleeves 33, 34 and has in its inner peripheral surface splines adapted to cooperate with the splines of the sleeves 33, 34. The sleeve 38 is slidably mounted and its length is such as to enable it to be displaced from a first position (shown in the drawing) in which it solely surrounds the sleeve 33 to a second position in which its splines engage both the splines of the sleeves 33, 34 and thus interconnects the body 4 and the ring gear 23 as concerns rotation.

The sleeve 38 of the locking device is shifted by means of a rod 39 which extends through an aperture in the portion 30 of the semi-shell 22a and has at its inner end an eccentric finger member 40 engaged in a peripheral groove 41 in the sleeve 38.

It will be understood that, when the rod 39 is rotated, the finger member 40 drives the sleeve 38 which slides to a position in which its splines are engaged with the splines of the two sleeves simultaneously and thus locks the ring gear 23 to the body 4.

It will be observed that this locking device interposed between the two differentials does not increase the overall size of the whole of the device.

The unit according to the invention is particularly simple, compact and therefore cheap and it may be mounted on series production vehicles directly on the assembly line by means of simple and cheap devices. Further, it does not require an increase in the ground clearance of the vehicle.

This unit is preferably completed by a second locking device of the original differential, of any conventional type, for example having a limited sliding effect provided for use in the event of slip of the front left wheel.

Although the invention has been described in its application to a vehicle having a transverse engine and a front-wheel drive, it will be understood that it is also applicable to a vehicle having a transverse rear engine or a longitudinal engine mounted at the front or rear end of the vehicle.

Having now described my invention what I claim as new and desire to secure by Letters Patent is:

1. A transmission device for a four-wheel drive vehicle comprising at least two differentials, a first of said differentials having a first output semi-shaft and a second output semi-shaft respectively drivingly connected to a first driving wheel and to a second driving wheel of a first axle of the vehicle, a second of said differentials being interposed between the first differential and said first driving wheel, the second differential having an input element drivenly connected to said first semi-shaft of the first differential, a first output element drivingly connected to said first driving wheel and a second output element, a transmission shaft being drivenly connected to said second output element and drivingly connected to a second axle.

2. A transmission device according to claim 1, wherein said first and second differentials have housings which are connected together, the first differential and the second differential each have a body and locking means are provided between the body of the first differential and said second output element.

3. A transmission device according to claim 2, wherein the end of said first output semi-shaft drives the second differential from the interior of the second differential and a shaft connected to the body of said second differential and carrying planet gears of the second differential is mounted on said first output semi-shaft so as to be driven in rotation thereby.

4. A transmission device according to claim 3, wherein a sun gear of the second differential is coupled to a semi-shaft carrying said first driving wheel of the vehicle, and another sun gear of the second differential is constituted by teeth on said second output element.

5. A transmission device according to claim 4, wherein said second output element is freely rotatively mounted on said first semi-shaft and has outer teeth constituting a ring gear which is meshed with a gear pinion rigid with said transmission shaft.

6. A transmission device according to claim 2, wherein said locking means comprise two members rotatively mounted in end-to-end relation to each other on said first semi-shaft, one of said two members being connected to rotate with said second output element and the other of said two members being connected to said body of the first differential and cooperative with connecting means.

7. A transmission device according to claim 6, wherein said rotatively mounted members are formed by two sleeves including dog clutches engaged with complementary dog clutches of said second output element and said body respectively and having outer splines, said connecting means comprising a sleeve having complementary inner splines and axially slidably mounted on said two members of the locking means.

8. A transmission device according to claim 7, wherein said connecting means comprises an outer peripheral groove in which is engaged an eccentric finger member of a control rod which is rotatively mounted in and extends through the housing of one of said first and second differentials.

9. A transmission device according to claim 1, wherein the first differential is of the epicyclic train type having a ring gear and such features that the driving torque applied to the ring gear is unequally divided between the semi-shaft driving said wheel and the semi-shaft driving the second differential.

10. A transmission device according to claim 9, wherein said driving torque is divided in the proportion of $\frac{1}{3}$ for the second semi-shaft driving the second wheel and $\frac{2}{3}$ for the first semi-shaft driving the second differential.

* * * * *